(12) United States Patent
Zhang et al.

(10) Patent No.: US 10,753,827 B2
(45) Date of Patent: Aug. 25, 2020

(54) METHOD AND SYSTEM FOR MEASURING VERTICAL WHEEL IMPACT FORCE IN REAL-TIME BASED ON TIRE PRESSURE MONITORING

(71) Applicant: SOUTHEAST UNIVERSITY, Nanjing (CN)

(72) Inventors: Jian Zhang, Nanjing (CN); Zhao Chen, Nanjing (CN); Wenju Zhao, Nanjing (CN); Liming Zhou, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 129 days.

(21) Appl. No.: 16/316,351

(22) PCT Filed: Aug. 26, 2016

(86) PCT No.: PCT/CN2016/096944
§ 371 (c)(1),
(2) Date: Jan. 9, 2019

(87) PCT Pub. No.: WO2018/023845
PCT Pub. Date: Feb. 8, 2018

(65) Prior Publication Data
US 2019/0234834 A1    Aug. 1, 2019

(30) Foreign Application Priority Data
Aug. 3, 2016    (CN) .......................... 2016 1 0628399

(51) Int. Cl.
*B60C 23/04*    (2006.01)
*G01M 17/02*    (2006.01)
(Continued)

(52) U.S. Cl.
CPC ....... *G01M 17/013* (2013.01); *B60C 23/0477* (2013.01); *B60C 23/0479* (2013.01); *G01L 5/0052* (2013.01)

(58) Field of Classification Search
USPC ................................................. 73/146–146.8
See application file for complete search history.

(56) References Cited

U.S. PATENT DOCUMENTS 4,711,754 A * 12/1987 Bednar .................. G21C 17/00
376/245
6,301,544 B1    10/2001 Sonderegger
(Continued)

FOREIGN PATENT DOCUMENTS

CN    2847243 Y    12/2006
CN    101893472 A    11/2010
(Continued)

*Primary Examiner* — Andre J Allen
(74) *Attorney, Agent, or Firm* — Bayramoglu Law Offices LLC

(57) ABSTRACT

A method and system for measuring vertical wheel impact force in real-time based on tire pressure monitoring is provided by the present invention. The system mainly includes the four modules, namely a tire pressure derotation preprocessing, a tire pressure-wheel force system identification, a calibration method, and an integrated device for tire pressure-wheel force measurement. The method uses the integrated device to collect tire pressure data in real-time. The corresponding vertical wheel impact force is obtained through the derotation preprocessing and the tire pressure-wheel force system identification, and is calibrated according to the calibration method. The present invention provides an efficient, accurate, and highly adaptable wheel force measurement solution in the theoretical aspect and device aspect, which meets the requirements for the quick evaluation of the bridge health condition. Also, the present inven- (Continued)

tion has a great potential in the fields such as road safety diagnosis, automobile performance related design, etc.

8 Claims, 8 Drawing Sheets

(51) Int. Cl.
  G01M 17/013 (2006.01)
  G01L 5/00 (2006.01)

(56) References Cited

U.S. PATENT DOCUMENTS

| | | | | |
|---|---|---|---|---|
| 6,523,391 | B1* | 2/2003 | Knox | G01M 7/08 73/12.01 |
| 2008/0119978 | A1* | 5/2008 | Stieff | G01B 11/2755 701/31.4 |
| 2014/0060715 | A1* | 3/2014 | Winshtein | A61G 5/1081 152/7 |
| 2014/0116199 | A1* | 5/2014 | Rogozinski | F16F 15/161 74/573.12 |
| 2014/0366618 | A1* | 12/2014 | Singh | B60C 11/24 73/146.3 |
| 2015/0040656 | A1* | 2/2015 | Singh | B60C 11/246 73/146.5 |
| 2015/0224845 | A1* | 8/2015 | Anderson | B60G 17/052 701/37 |
| 2017/0292895 | A1* | 10/2017 | Hou | G01N 3/40 |
| 2019/0381998 | A1* | 12/2019 | Anderson | B60W 50/14 |

FOREIGN PATENT DOCUMENTS

| | | |
|---|---|---|
| CN | 103407335 A | 11/2013 |
| CN | 104275994 A | 1/2015 |
| CN | 104517441 A | 4/2015 |
| CN | 107144384 A * | 9/2017 |

* cited by examiner

METHOD AND SYSTEM FOR MEASURING VERTICAL WHEEL IMPACT FORCE IN REAL-TIME BASED ON TIRE PRESSURE MONITORING

CROSS REFERENCE TO RELATED APPLICATIONS

This application is the national phase entry of International Application No. PCT/CN2016/096944, filed on Aug. 26, 2016, which is based upon and claims priority to Chinese Patent Application No. 201610628399.7, filed on Aug. 3, 2016, the entire contents of which are incorporated herein by reference.

TECHNICAL FIELD

The present invention relates to the field of tire performance monitoring, particularly to a method and system for measuring vertical wheel impact force in real-time based on tire pressure monitoring.

BACKGROUND

Bridges, part of transportation infrastructure, play a noticeable role in social and economic development. Taking the United States for example, there are more than 600,000 in-service bridges nationwide; an average age of these bridges is more than 40 years, and the deterioration of bridges account for about 25% of these bridges. The I-35W bridge in Minneapolis collapsed in the year 2007 and caused an economic loss of $200 million. At present, China is gradually emerging from the golden period of infrastructure construction. For more than 750,000 in-service bridges, a considerable part of which are facing aging problems. Research shows that the number of dangerous bridges of category four and five in China exceeds 90,000. In order to ensure the normal development of economy and society, it is urgently needed to maintain and manage these in-service bridges, practically and effectively. Vehicle load, which is the main form of loads in the service of the bridges, plays an important role in the degradation process of structural performance. Moreover, the safety threat to the bridge deck pavement and the bridge structure from the overload vehicles is becoming increasingly evident. In order to provide a valuable reference for better bridge maintenance management and engineering design, the problem of vehicle-bridge coupling has become a major research topic in the field of bridge engineering.

Due to the limit of conditions, it has been difficult to measure the actual dynamic vehicle load. Usually, the static mass of the vehicle is considered, while the gained vertical wheel impact force is ignored. As a result, the evaluation of bridge health conditions such as structural identification and the like is adversely affected. If complex algorithms considering parameters such as pavement roughness and the like are adopted, not only accurate pavement surface information needs to be provided, but also the calculation difficulty will be increased. Once the accurate wheel force of the vehicle during driving on the bridge rather than the static mass of the vehicle is obtained, the accuracy of the result recognition can be improved while the calculation difficulty is reduced, thereby significantly improving the evaluation effect of the health condition of the bridges.

At present, there are some methods and techniques for measuring wheel force, but they still have various drawbacks. The dynamic weighing system is a mature technique for detecting the overload vehicles in the highway network. However, the dynamic weighing system can only acquire the wheel force in a narrow range and a short time. For example, the dynamic weighing system can only acquire the wheel force at the time when the vehicle is passing the bridgehead, while it cannot acquire the wheel force of the vehicle during passing over the whole bridge. Wheel six-component force measuring system based on wheel hub strain can acquire force information of the wheels in three directions. However, strictly speaking, these six-component forces are specific to the hub deformation, which is different from the actual contact force between the tire and the ground. Therefore, using this technique in the evaluation of bridge health condition will inevitably cause errors. In addition, since such system has complicated construction, provides too much information and is costly, it has not been widely used in the field of bridge engineering.

SUMMARY

Objective of the present invention: in order to eliminate the deficiencies in the prior art, the present invention provides a method and system for measuring vertical wheel impact force in real-time based on tire pressure monitoring.

Technical solution: an integrated device is used to collect real-time tire pressure data. The corresponding wheel force is obtained through a tire pressure derotation preprocessing and a tire pressure-wheel force system identification, and calibrated according to a calibration method. The integrated device includes the tire pressure derotation preprocessing, the tire pressure-wheel force system identification, the calibration method, and a tire pressure-wheel force measurement.

Specifically, the tire pressure derotation preprocessing eliminates periodic interferences caused by an uneven air pressure distribution during a rotation of the tire by a method of filtering, so that the tire pressure data after the preprocessing directly reflects the effects of the vertical wheel impact force.

Specifically, in the tire pressure-wheel force system identification, a relation model of the tire pressure and the vertical wheel impact force is established according to the tire vibration characteristics, and specific parameters of the relation model are identified according to accurate tire pressure data and accurate wheel force data obtained from a calibration test, so that the corresponding wheel force is calculated in a subsequent formal test with merely the tire pressure known.

Specifically, the tire pressure-wheel force system identification includes two calculation methods, namely, a gray box model and a black box model. The two calculation methods can correct each other to optimize results.

Specifically, the calculation method of the gray box model is as follows.

First, a relationship between a vertical deformation of a tire and the vertical wheel impact force is described by a single-degree-of-freedom mass-spring-damper model, and the formula is presented below:

$$c\dot{x} + kx = F_{tire}$$

where, c is a vertical damping of the tire; k is a vertical stiffness of the tire; x is the vertical deformation of the tire under dynamic load; $\dot{x}$ is a first-order differential of time; and $F_{tire}$ is the vertical wheel impact force.

Second, a relationship between the tire pressure and the vertical deformation of the tire is established according to an ideal gas equation, and the formula is presented below:

$$x = \frac{p_0 V_0}{aA(p_0 + \Delta p)}\left(1 - \frac{p_0}{p_0 + \Delta p}\right)$$

$$\dot{x} = -\frac{p_0 \Delta \dot{p} V_0}{aA(p_0 + \Delta p)^2} \times \left(1 - \frac{2p_0}{p_0 + \Delta p}\right)$$

where, $p_0$ is an initial tire pressure; $\Delta p$ is a tire pressure change under dynamic load, the derotation preprocessing proposed by the present invention should be implemented; $\Delta \dot{p}$ is a first-order differential of $\Delta p$ for time; $V_0$ is an initial volume of an inner cavity of the tire under a static load; A is a contact area of the tire under the static load, and an effect of a tire deformation on the contact area is expressed by $$aA\left(1 + \frac{\Delta p}{P_0}\right).$$

Accordingly, the relationship between the tire pressure and the vertical wheel impact force is obtained, and the formula is presented below:

$$F_{tire} = \frac{cp_0 V_0 (p_0 - \Delta p)}{aA(p_0 + \Delta p)^3} \times \Delta \dot{p} + \frac{kp_0 V_0 \Delta p}{aA(p_0 + \Delta p)^2}$$

Lastly, according to the accurate tire pressure data and accurate wheel force data obtained from the calibration test, the unknown parameters in the tire pressure-vertical wheel impact force formula are identified through Kalman filtering. Assuming that the parameters to be identified include $$\alpha = \frac{cp_0 V_0}{aA}, \beta = \frac{k}{c},$$

the output is $$y = \frac{\Delta p}{(p_0 + \Delta p)^2},$$

and the input is $u = F_{tire}$, the state variable is expressed as follows:

$$\begin{bmatrix} x_1 \\ x_2 \\ x_3 \end{bmatrix} = \begin{bmatrix} y \\ \alpha \\ \beta \end{bmatrix}$$

the state equation is expressed as follows:

$$\begin{bmatrix} \dot{x}_1 \\ \dot{x}_2 \\ \dot{x}_3 \end{bmatrix} = \begin{bmatrix} y \\ 0 \\ 0 \end{bmatrix} = \begin{bmatrix} \frac{u}{x^2} - x_1 x_3 \\ 0 \\ 0 \end{bmatrix}$$

and the observation equation is expressed as follows:

$$y = [1, 0, 0] \begin{bmatrix} x_1 \\ x_2 \\ x_3 \end{bmatrix}$$

Accordingly, a complete tire pressure-wheel force formula can be obtained, and the corresponding wheel force data can be obtained when merely the tire pressure data is known.

The calculation method of the black box model is as follows: assuming that the tire pressure change and the vertical wheel impact force satisfy a linear convolution relationship, then in a frequency domain, the following formula can be obtained:

$$F_{tire}(w) = \Delta p(w) H(w)$$

where, $H(w)$ is a frequency response function; $F_{tire}(w)$ and $\Delta p(w)$ are Fourier transforms of time-history data of $F_{tire}(t)$ and $\Delta p(t)$ respectively.

The frequency response function is identified according to the accurate tire pressure data and accurate wheel force data obtained from the calibration test. Accordingly, the corresponding wheel force data can be obtained when merely the tire pressure data is known.

Specifically, the integrated device for tire pressure-vertical wheel impact force measurement includes a tire pressure sensing system, a central signal control system, and a data analysis system. The tire pressure sensing system collects air pressure change data in the inner cavity of the tire through a tire pressure sensor, and exchanges instructions and data with the central signal control system through a local signal controller in a wired or wireless control manner. The central signal control system exchanges collected data with the tire pressure sensing system and the data analysis system. The data analysis system uses an embedded real-time vertical wheel impact force calculation program to automatically analyze the data and output a visual evaluation result of the wheel force.

Specifically, the calibration method uses a set of test devices and a calculation method to obtain accurate wheel force data, and calibrates the provided system for measuring vertical wheel impact force in real-time based on tire pressure monitoring.

The test device for calibration integrates data collection, signal transmission, and result analysis as a whole and mainly includes approach bridge tracks, a main bridge track, a track acceleration sensing system, a track bearing force sensing system, a central signal control system, and a data analysis system. When a tire rolls on the main bridge track, the wheel force is obtained according to collected track vibration information. The tire enters the main bridge track from the approach bridge track, and the main bridge track only contacts with the ground through bearings. The track acceleration sensing system collects a vertical acceleration of the track and exchanges instructions and data with the central signal control system in a wired or wireless manner. The track bearing force sensing system collects a bearing force of the track and exchanges instructions and data with the central signal control system in a wired or wireless manner. In addition to exchange data and instructions with the two sensing systems, the central signal control system also provides data to the data analysis system. The data analysis system uses an embedded algorithm program to analyze the data and output a visual evaluation result of the calibrated wheel force.

The calculation method of the calibration of the wheel force is as follows. When the tire rolls on the main bridge track, the wheel force and a structural response of the track satisfy the following formula:

$$F_{tire}+G_{tire}=\Sigma F_{bearing}+\Sigma ma$$

where, $F_{tire}$ is a vertical wheel impact force; $G_{tire}$ is a static load of the tire; $\Sigma F_{bearing}$ is a resultant force of the bearings after removing the weight of the main bridge track, namely, merely subjected to the effects of the tire; $\Sigma ma$ is a resultant inertia force of various units of the main bridge track.

In use, the implementation steps of the present invention are as follows: completing the installation and debugging of the device; obtaining the accurate tire pressure data and wheel force data through the calibration test; performing the tire pressure derotation preprocessing; obtaining the relationship between the tire pressure and the wheel force through a system identification of the grey box model or the black box model; obtaining the tire pressure data from the integrated device for tire pressure-wheel force measurement in the formal test; performing the tire pressure derotation preprocessing; and calculating the wheel force according to the relationship between the tire pressure and the wheel force.

The present invention is applicable to all scientific researches and engineering activities related to wheel force in bridge engineering, road engineering, and vehicle engineering, and the scope of the application should not be limited to the field of bridge engineering.

PRINCIPLE OF INVENTION

As shown in FIG. 1, the integrated device for tire pressure-wheel impact force measurement can realize functions such as data collection, signal transmission, and result analysis, etc., and complete a series of steps from collecting the tire pressure to displaying visual results of the real-time wheel force.

A. Tire Pressure Sensing System

The tire pressure sensing system collects air pressure change data of an inner cavity of the tire through a tire pressure sensor, and exchanges instructions and transmits data with/to the central signal control system through a local signal controller.

B. Central Signal Control System

The central signal control system exchanges instructions and transmits data with/to the tire pressure sensing system and the data analysis system.

C. Data Analysis System

The data analysis system uses an embedded real-time vertical wheel impact force calculation program to automatically analyze data transmitted from the central signal control system and output a visual evaluation result.

2. The proposed calibration method can acquire accurate vertical wheel impact force, and make it convenient to identify unknown parameters of the relation equation of the tire pressure and wheel force, so that the wheel force can be calculated in the subsequent formal test when merely the tire pressure is known. The method mainly includes an integrated test device and a calculation method.

(1) Integrated Test Device

When the tire rolls on the main bridge track, the vertical wheel impact force is obtained according to the collected track vibration information. The device integrates data collection, signal transmission, and result analysis as a whole.

A. Approach Bridge Track

The tire enters the main bridge track from the approach bridge track. The approach bridge track is not directly connected to the main bridge track. By doing so, it is ensured that the main bridge track is independently subjected to forces. The approach bridge track mainly plays a transitional role, and allows the tire to enter an ideal working condition state from a static state.

B. Main Bridge Track

The tire traveling on the main bridge track is a key stage of the calibration test. The track acceleration sensing system and track bearing force sensing system mounted on the main bridge track record the structural response under the wheel force, thereby providing basic data for calculating the calibrated wheel force. The main bridge track contacts with the ground through the bearings, and each bearing is provided with a force sensor. The main girder track is divided into a plurality of units according to the calculation accuracy, and each unit is provided with a vertical acceleration sensor. The main bridge track can be set with different pavement conditions according to the requirements of working conditions.

C. Track Acceleration Sensing System

The track acceleration sensing system is responsible for collecting the vertical acceleration data of the main bridge track and exchanging instructions and data with the central signal control system in a wired or wireless manner. The acceleration sensor should be arranged on each unit of the main bridge track.

D. Track Bearing Force Sensing System

The track bearing force sensing system is responsible for collecting the bearing force data of the main bridge track, and exchanging instructions and data with the central signal control system in a wire or wireless manner.

E. Central Signal Control System

The central signal control system is responsible for exchanging instructions and data with the track acceleration sensing system and the track bearing force sensing system, controlling the start and end of data collection, handling the synchronization and matching problems of data, and feeding back the collected acceleration data and the bearing force data to the data analysis system.

F. Data Analysis System

The data analysis system uses the embedded algorithm program to process the acceleration data and the bearing force data transmitted by the central signal control system, and outputs the calculation result of the calibrated wheel force in a visual form.

(2) Calculation Method

When the tire rolls on the main bridge track, the wheel force and the structural response of the track satisfy the following formula.

$$F_{tire}+G_{tire}=\Sigma F_{bearing}+\Sigma ma$$

where, $F_{tire}$ is a vertical wheel impact force; $G_{tire}$ is a static load of the tire; $\Sigma F_{bearing}$ is a resultant force of the bearings after removing the weight of the main bridge track, namely, merely subjected to the effects of the tire; $\Sigma ma$ is a resultant inertia force of various units of the main bridge track.

3. Tire Pressure Derotation Preprocessing

Since the position of the air pressure sensor relative to the tire is fixed, the spatial position of the sensor constantly changes as the tire rotates, which causes interference with the collected tire pressure data. When the tire is in a rolling state, the air pressure in the empty cavity will produce a stable uneven distribution, as shown in FIG. 4. However, the air pressure sensor observes this unevenness as the tire rotates and intuitively represents this unevenness as a periodic trend variation in the data, as shown in FIG. 5. The periodic trend variation can cause tire pressure data drift, and interferes with the relationship between tire pressure and wheel force. In order to eliminate this interference, a filtering method is required to eliminate the effects of rotation.

4. Calculation Method of Grey Box Model for Tire Pressure-Wheel Force System Identification The present invention provides a gray box model calculation method by combining a tire vertical vibration model and actual data to describe the relationship between the tire pressure and the vertical wheel impact force. The calculation method mainly includes the following parts: tire vertical vibration model, gas-solid coupling condition, tire pressure-vertical wheel impact force equation, and Kalman filtering parameter identification.

(1) Tire Vertical Vibration Model

When the vehicle is traveling on the pavement, especially when the pavement surface is rough or there is high tire impact, the coupling of the tire vertical deformation and the vertical wheel impact force is powerful. Accordingly, a single-degree-of-freedom mass-spring-damper model as shown in FIG. 6 can be used to describe the moving relationship between the tire vertical deformation and the ground vertical contact force, formula is presented below:

$$c\dot{x} + kx = F_{tire}$$

where, $c$ is a vertical damping of the tire; $k$ is a vertical stiffness of the tire; $x$ is the vertical deformation of the tire under dynamic load; $\dot{x}$ is a first-order differential of time; and $F_{tire}$ is the vertical wheel impact force.

(2) Gas-Solid Coupling Condition

When the tire is in contact with the ground, the ground vertical contact force will cause deformation of the tire structure, and the inner space for gas is squeezed, thereby causing the pressure change of the sealed gas. Assuming that the gas in the empty cavity of the tire is sealed and has constant temperature, the following formula would be satisfied:

$$p_0 V_0 = (p_0 + \Delta p)(V_0 + Ax)$$

where, $p_0$ is an initial tire pressure; $\Delta p$ is a tire pressure change under dynamic load, and the derotation preprocessing provided by the present invention should be performed; $\Delta \dot{p}$ is a first-order differential of $\Delta p$ for time; $V_0$ is an initial volume of an inner cavity of the tire under a static load; $A$ is a contact area of the tire under the static load, and an effect of a tire deformation on the contact area is expressed by $$aA\left(1 + \frac{\Delta p}{p_0}\right).$$

(3) Tire Pressure-Vertical Wheel Impact Force Equation

According to the tire vertical vibration model and the gas-solid coupling condition, the relationship between the tire pressure change and the vertical wheel impact force can be established; the formula is presented below:

$$F_{tire} = \frac{cp_0 V_0 (p_0 - \Delta p)}{aA(p_0 + \Delta p)^3} \times \Delta\dot{p} + \frac{kp_0 V_0 \Delta p}{aA(p_0 + \Delta p)^2}$$

(4) Kalman Parameter Identification

Based on the input and output data of the system, the Kalman filter algorithm can identify unknown parameters in the system. With this characteristic, the Kalman filter algorithm is used to identify the unknown parameters of the tire pressure-vertical wheel impact force equation. Assuming that the parameters to be identified include $$\alpha = \frac{cp_0 V_0}{aA}, \beta = \frac{k}{c},$$

the output is $$y = \frac{\Delta p}{(p_0 + \Delta p)^2},$$

and the input is $u = F_{tire}$, then the state variable is presented below:

$$\begin{bmatrix} x_1 \\ x_2 \\ x_3 \end{bmatrix} = \begin{bmatrix} y \\ \alpha \\ \beta \end{bmatrix}$$

the state equation is presented below:

$$\begin{bmatrix} \dot{x}_1 \\ \dot{x}_2 \\ \dot{x}_3 \end{bmatrix} = \begin{bmatrix} \dot{y} \\ 0 \\ 0 \end{bmatrix} = \begin{bmatrix} \frac{u}{x_2} - x_1 x_3 \\ 0 \\ 0 \end{bmatrix}$$

the observation equation is presented below:

$$y = [1, 0, 0] \begin{bmatrix} x_1 \\ x_2 \\ x_3 \end{bmatrix}$$

After the parameter identification is completed, the corresponding vertical wheel impact force can be calculated merely according to the tire pressure in a subsequent formal test.

5. Calculation Method of Black Box Model for Tire Pressure-Wheel Force System Identification When the pavement surface is rough or there is high impact force to the tire, the ground vibration will cause deformation of the tire structure, and inner space for gas will be squeezed, thereby causing the pressure change of the sealed gas. Assuming that there is a transient and strong linear relationship between the tire pressure change and the wheel force at this time, and the linear convolution formula is satisfied, in the frequency domain, the following formula can be obtained:

$$F_{tire}(w) = \Delta p(w) H(w)$$

where, $H(w)$ is a frequency response function; $F_{tire}(w)$ and $\Delta p(w)$ are Fourier transforms of time-history data of $F_{tire}(t)$ and $\Delta p(t)$ respectively.

After the frequency response function $H(w)$ is obtained in the calibration test, the ground vertical contact force $F_{tire}(t)$ can be calculated according to the tire pressure change $\Delta p(t)$ in the formal test.

Advantages: the prevent invention can accurately measure the corresponding wheel force by collecting tire pressure information through an integrated device in combination with the embedded tire pressure derotation preprocessing and the tire pressure-wheel force system identification algorithm, and the calibration is implemented according to the calibration test. Accordingly, the present invention makes the following remarkable progress.

A. The measurement time is longer. Compared with the dynamic weighing system, the present invention can measure the vertical wheel impact force of a vehicle over a long distance.

B. The contact force between the tire and the ground is measured. Compared with the wheel six-component force measurement system based on wheel hub strain, the present invention can obtain the contact force between the tire and the ground instead of the hub force which more strictly conforms to the definition of the wheel force.

C. The sensor is simple. Compared with the wheel six-component force measurement system requiring the installation of complicated strain sensor on wheel hub, the present invention only requires the installation of a tire pressure sensor on the nozzle.

D. Two measurement methods are provided. The prevent invention provides a gray box model calculation method and a black box model calculation method for the user to select alternatively, and the two methods can correct each other to obtain a more reliable result.

E. The calibration method of various pavement surfaces can be simulated. Compared with the simple roller working condition of the large-scale tire testing machine, the calibration method provided by the present invention can simulate complicated and realistic pavement surface roughness, and the measured wheel force is the ground contact force instead of the axle force.

In addition to the above-mentioned technical problems solved by the present invention, technical features constituting the technical solutions and advantages introduced by the technical features of these technical solutions, other technical problems that can be solved by the method and system for measuring vertical wheel impact force in real-time based on tire pressure monitoring of the present invention, other technical features included in the technical solution and advantages of these technical features will be further illustrated with reference to the accompanying drawings.

DETAILED DESCRIPTION OF THE EMBODIMENTS

Embodiments

Figure 7:
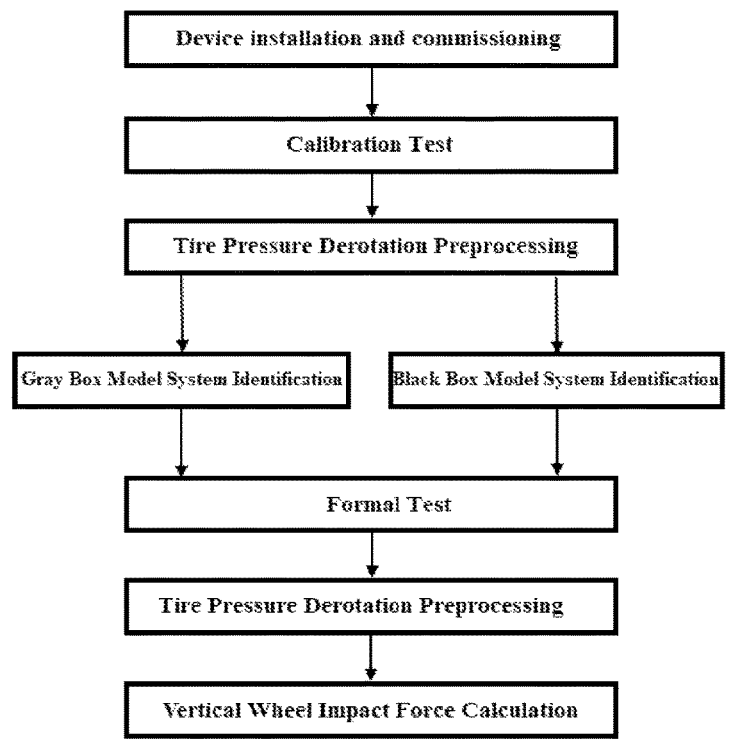
FIG. 7 is a flow diagram showing an implementation of a method for measuring vertical wheel impact force in real-time based on tire pressure monitoring of the present invention.

As shown in FIG. 7, the workflow of the system for measuring vertical wheel impact force in real-time based on tire pressure monitoring of the present embodiment is as follows.

Figure 1:
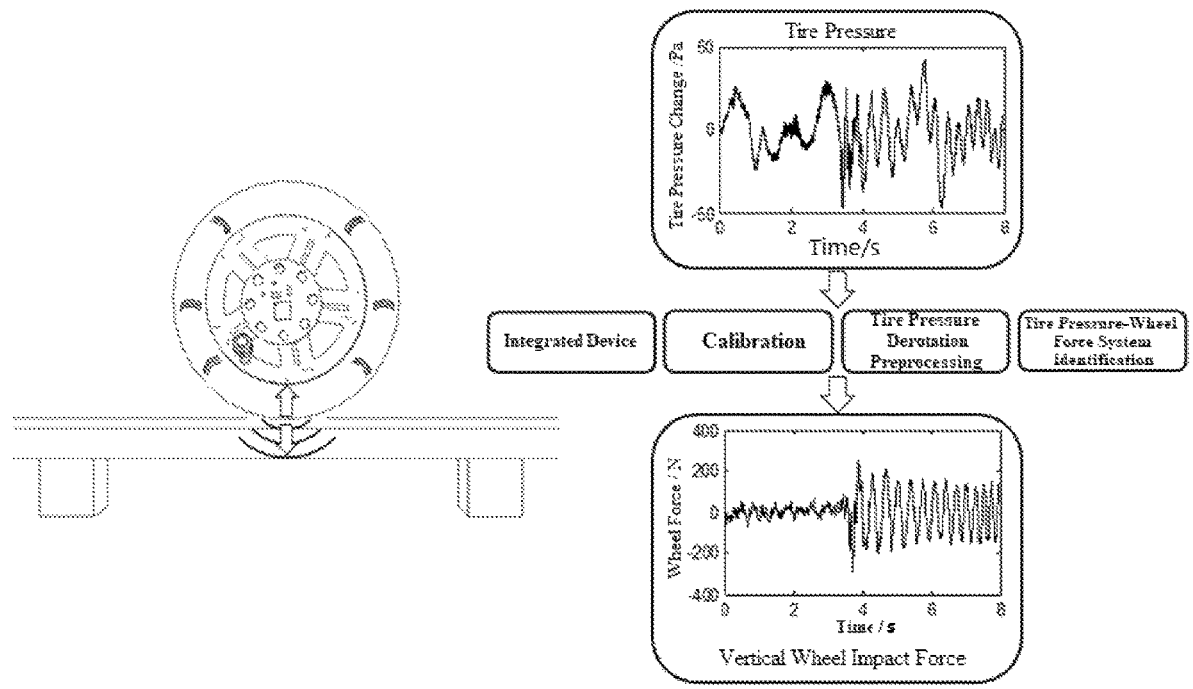
FIG. 1 is a conceptual diagram of a system for measuring vertical wheel impact force in real-time based on tire pressure monitoring of the present invention.
Figure 2:
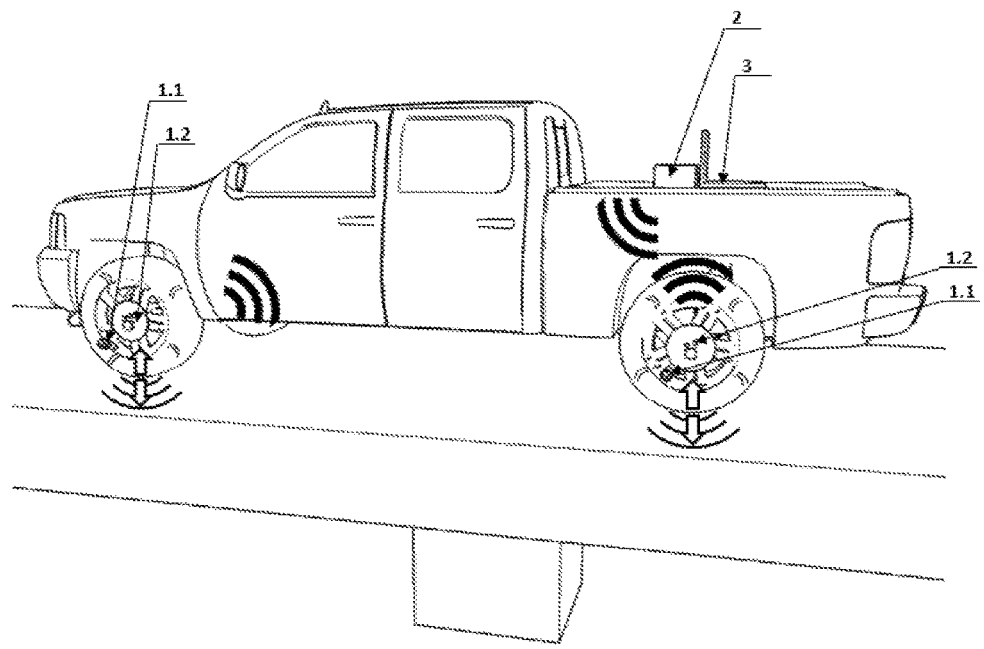
FIG. 2 is a diagram showing a tire pressure-wheel force integrated device of the present invention.

Step 1. The integrated device for tire pressure-vertical wheel impact force measurement was installed to realize functions such as data collection, signal transmission, and result analysis, etc., and complete a series of steps from tire pressure collection to visual result display of real-time wheel force. The entire device is shown in FIG. 2.

Before the test, a tire pressure sensing system is installed on the tire. The tire pressure sensing system consists of a tire pressure sensor 1.1 and a local signal controller 1.2, which are responsible for signal collection and signal transmission, respectively. A central signal control system 2 and a data analysis system 3 can be configured in the vehicle and responsible for overall signal transmission and control, and data analysis, respectively. After the installation of the devices is completed, a complete test process includes the following steps. The data analysis system 3 controls the start of the test. The central signal control system 2 sends a data collection command to the tire pressure sensing system. The tire pressure sensing system starts to collect tire air pressure data, and the data is fed back to the central signal control system 2 after collection. Lastly, the data comes together in the data analysis system 3, the collected data is automatically analyzed to output the visual evaluation results in combination with an embedded real-time tire pressure-vertical wheel impact force calculation program. In order to ensure the accuracy of the measurement results, the tire may be filled with low-thermal-conductivity gases such as nitrogen, etc., and the gas temperature is measured before and after the tire is used to make sure that the gas temperature is stable before and after use.

Step 2. Calibration Test

Figure 3:
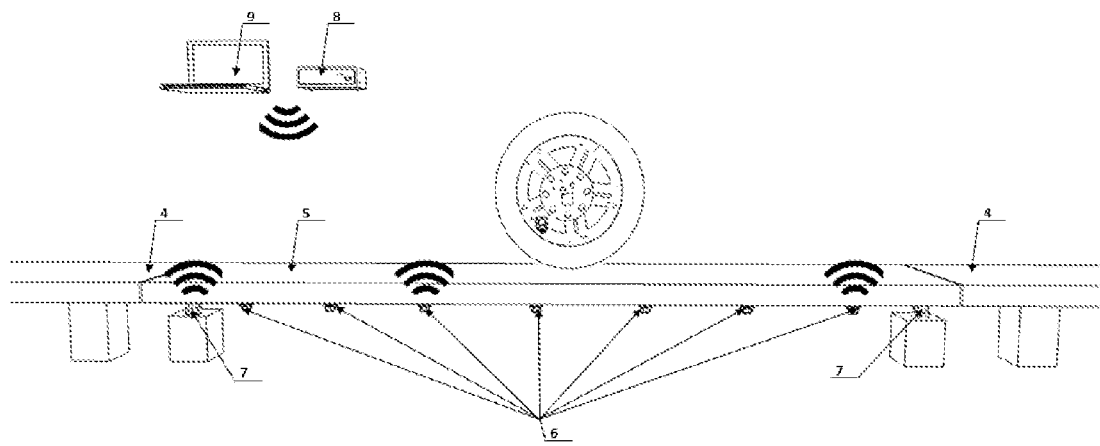
FIG. 3 is a diagram showing an integrated device for wheel force calibration of the present invention.

First, the relative integrated test devices should be installed and debugged. As shown in FIG. 3, two parallel tracks are arranged on an appropriate place. The two parallel tracks include approach bridge track 4 and main bridge track 5. The two parallel tracks are required to be placed for two wheels to travel on. The approach bridge track 4 and the main bridge track 5 should not be in contact with each other. The main bridge track 5 is divided into multiple units with a proper number and a vertical acceleration sensor is arranged at a center position of the lower surface of each unit to form a track acceleration sensing system 6. The main bridge track 5 is fixed to the ground through bearings, and each bearing is configured with a vertical bearing force sensor to form a track bearing force sensing system 7. A central signal control system 8 and a data analysis system 9 are arranged at appropriate locations in the laboratory.

Figure 8:
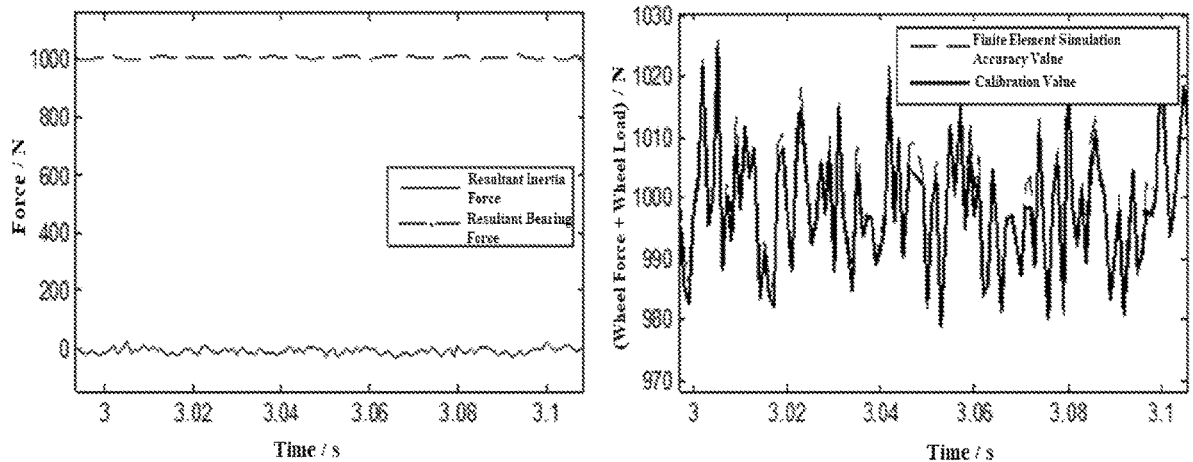
FIG. 8 is a diagram showing the calibration effect of the vertical wheel impact force of the present invention.

After the installation of the devices is completed, a complete calibration process includes the following steps. The data analysis system 9 controls the start of the test. The central signal control system 8 sends a data collection command to the track acceleration sensing system 6 and the track bearing force sensing system 7. The track acceleration sensing system 6 and the track bearing force sensing system 7 start collecting data simultaneously. The tire enters the main bridge track 5 from the approach bridge track 4, then gets off the bridge from the approach bridge track 4. After the tire gets off the bridge, the data collection is completed, and the track acceleration sensing system 6 and the track bearing force sensing system 7 feeds the data back to the central signal control system 8. The central signal control system 8 transmits the data to the data analysis system 9, and automatically outputs the visual result of the calibrated vertical wheel impact force in combination of the embedded calculation program. The effects are shown in FIG. 8.

The tire pressure data should be collected in synchronization with the collection of the vertical wheel impact force data to obtain the tire pressure information of the tire at the corresponding time on the approach bridge track 4 and the main bridge track 5.

The amount of the collected data and the number of samples should be sufficient and accurate enough to meet the calculation requirements of the tire system identification. The working conditions should be similar to the later formal measurement of the vertical wheel impact force (only the tire pressure data is collected). Generally, the working conditions are controlled and determined by factors such as the bearing load of the tire, the rotation speed, the initial inflation pressure, pavement surface roughness, etc.

Step 3. Tire Pressure Derotation Preprocessing

Figure 4:
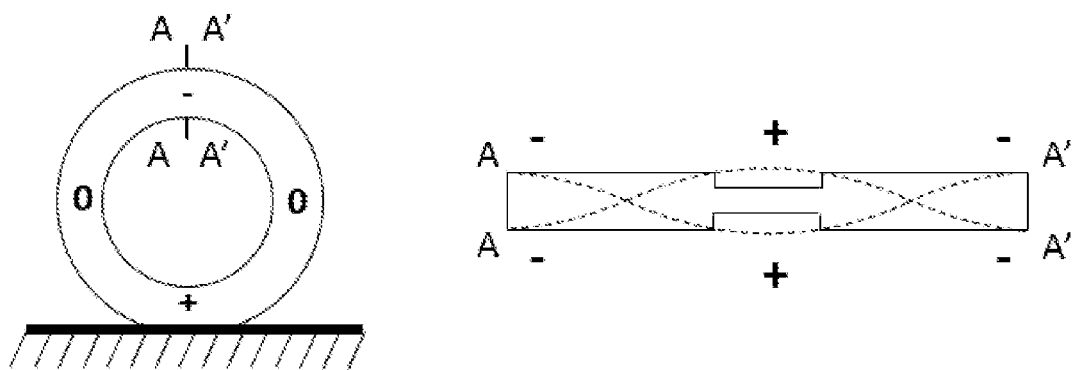
FIG. 4 is a diagram showing an uneven distribution of tire pressure of the present invention.
Figure 5:
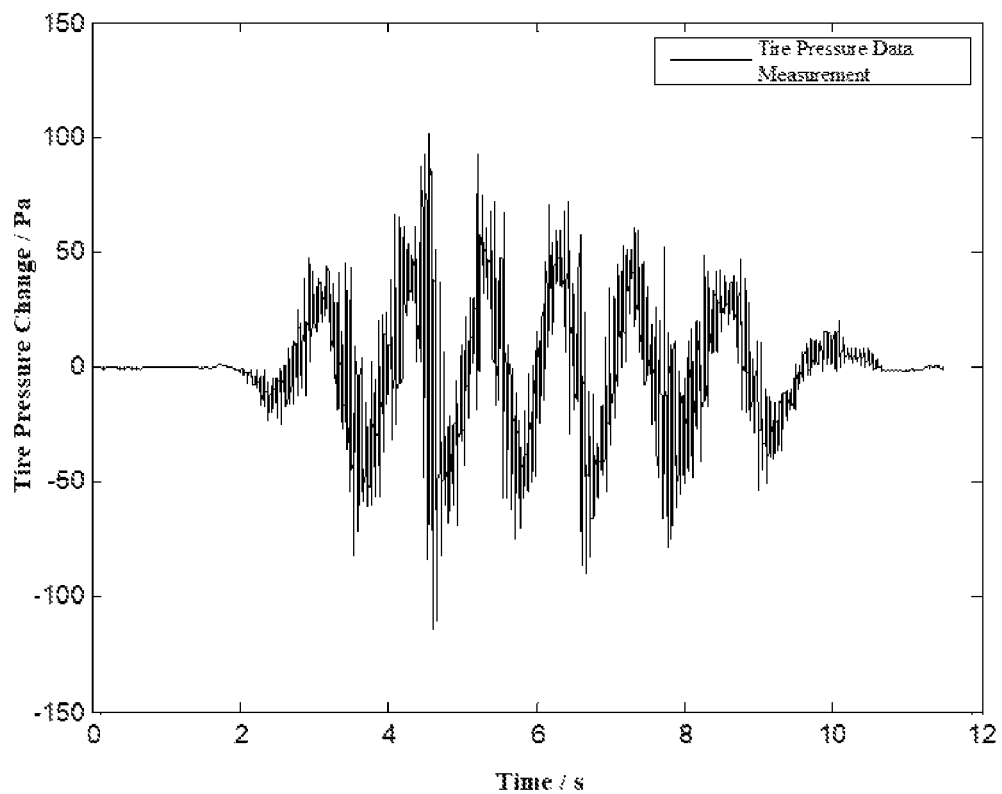
FIG. 5 is a diagram showing a periodic variation of air pressure sensor data caused by the uneven air pressure distribution of the present invention.
Figure 6:
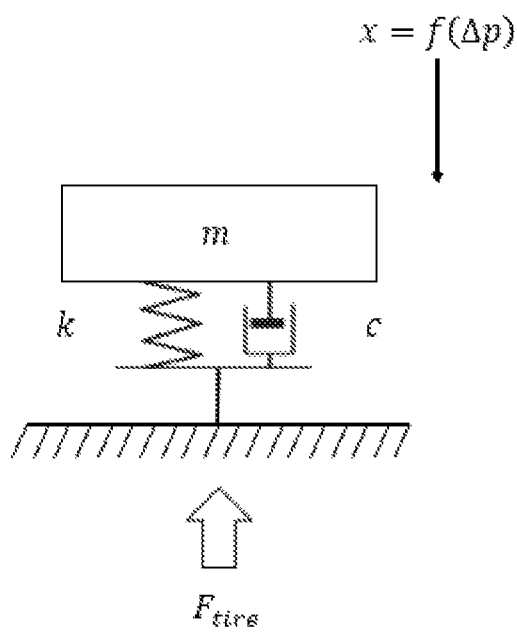
FIG. 6 is a dynamic model diagram of the vertical vibration relationship between the tire and the ground of the present invention.

Since the position of the air pressure sensor relative to the tire is fixed, the spatial position of the sensor changes constantly as the tire rotates, which causes interferences with the collected tire air pressure data. When the tire is in a rolling state, the air pressure in the empty cavity will produce a stable uneven distribution, as shown in FIG. 4. However, the air pressure sensor observes this unevenness as the position rotates and intuitively represents the unevenness as a periodic trend variation in the data, as shown in FIG. 5. Such periodic variation can cause tire pressure data drift, thereby interfering with the relationship between tire pressure and wheel force. In order to eliminate such interferences, a filtering method is required to eliminate the effects of rotation.

Figure 9:
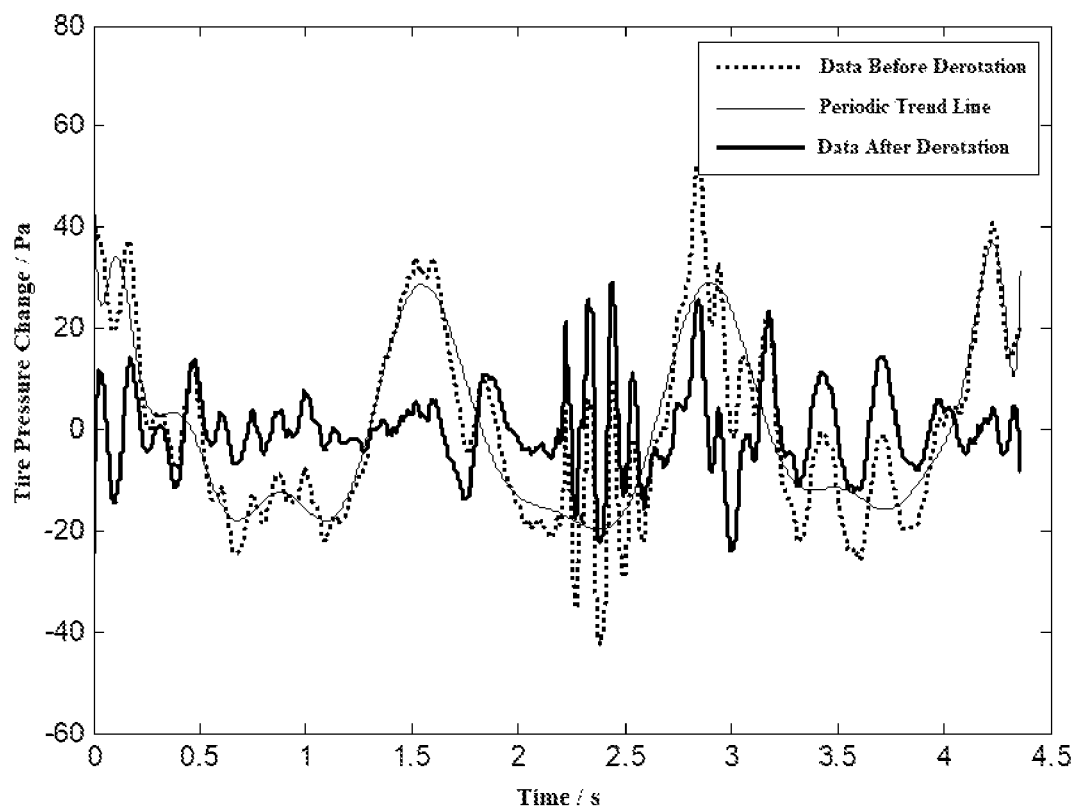
FIG. 9 is a diagram showing the tire pressure derotation preprocessing effect of the present invention.

The tire pressure derotation preprocessing makes the air pressure data directly reflect the vibration of the tire. The periodic trend line can be eliminated by the filtering, so as to remove the impacts of the uneven air pressure distribution. The processing effect is shown in FIG. 9.

Step 4. Tire Pressure-Vertical Wheel Impact Force System Identification.

The relationship between the tire pressure and the vertical wheel impact force is established according to the gray box model or the black box model. The unknown parameters in the tire pressure-wheel force relation formula are identified in combination with the accurate tire pressure data and wheel force data obtained through the calibration. After the complete relationship calculation between the tire pressure and the wheel force is obtained, the corresponding wheel force data can be calculated merely according to the tire pressure data.

(a) Gray Box Model Calculation Method

Figure 10:
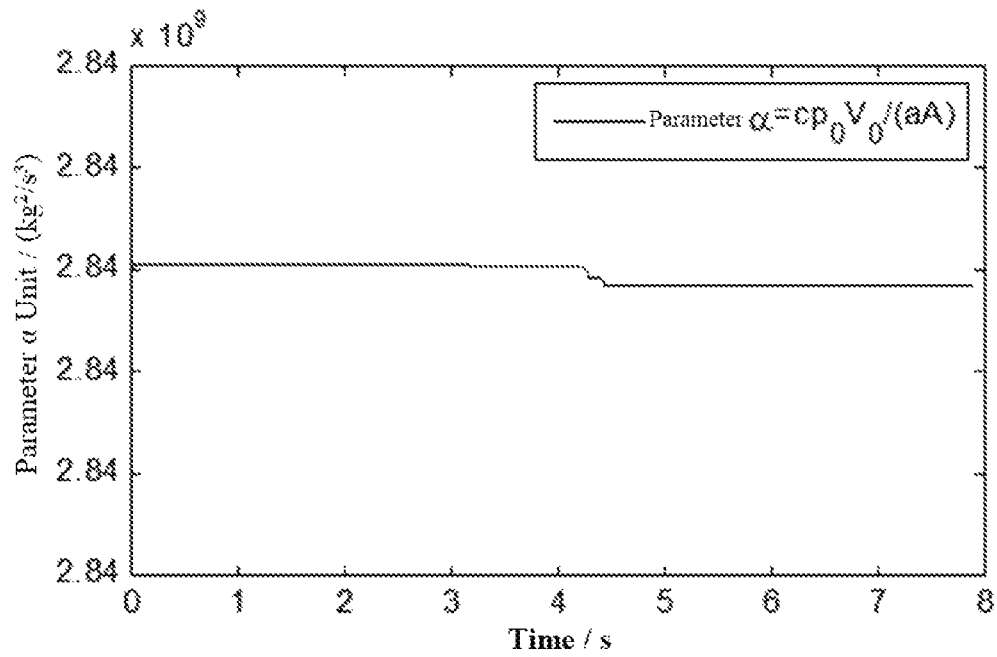
FIG. 10 is a diagram showing the identification effect of the parameter $\alpha$ of the Kalman evaluation algorithm of the present invention.
Figure 11:
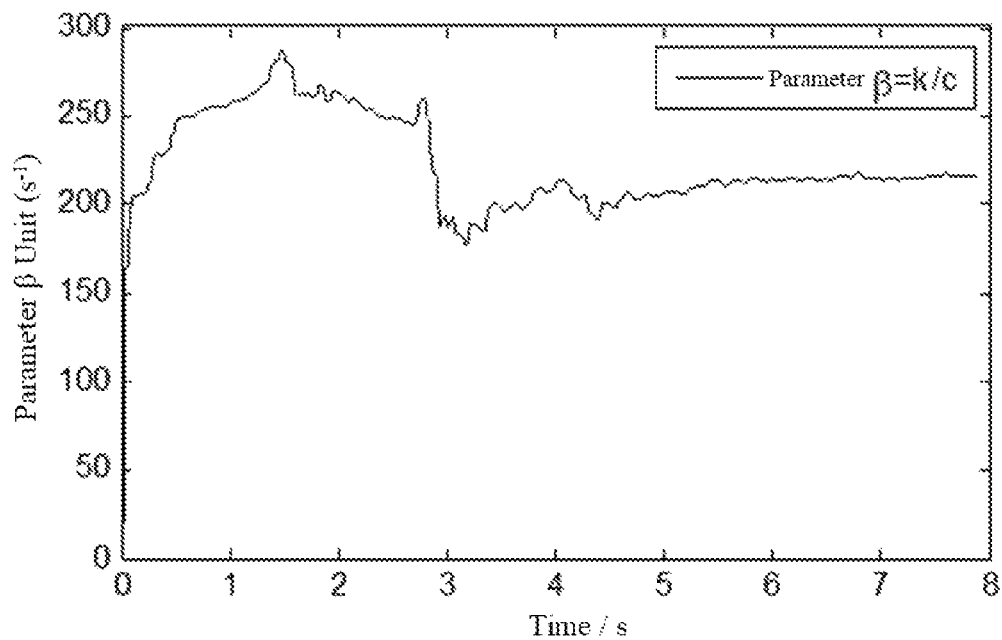
FIG. 11 is a diagram showing identification effect of the parameter $\beta$ of the Kalman evaluation algorithm of the present invention.

The unknown parameters in the tire pressure-vertical wheel impact force equation are identified according to the vertical wheel impact force data obtained from the calibration test and the tire pressure data obtained after the derotation preprocessing by using the Kalman filtering algorithm. The effects are shown in FIG. 10 and FIG. 11.

(b) Black Box Model Calculation Method

Figure 12:
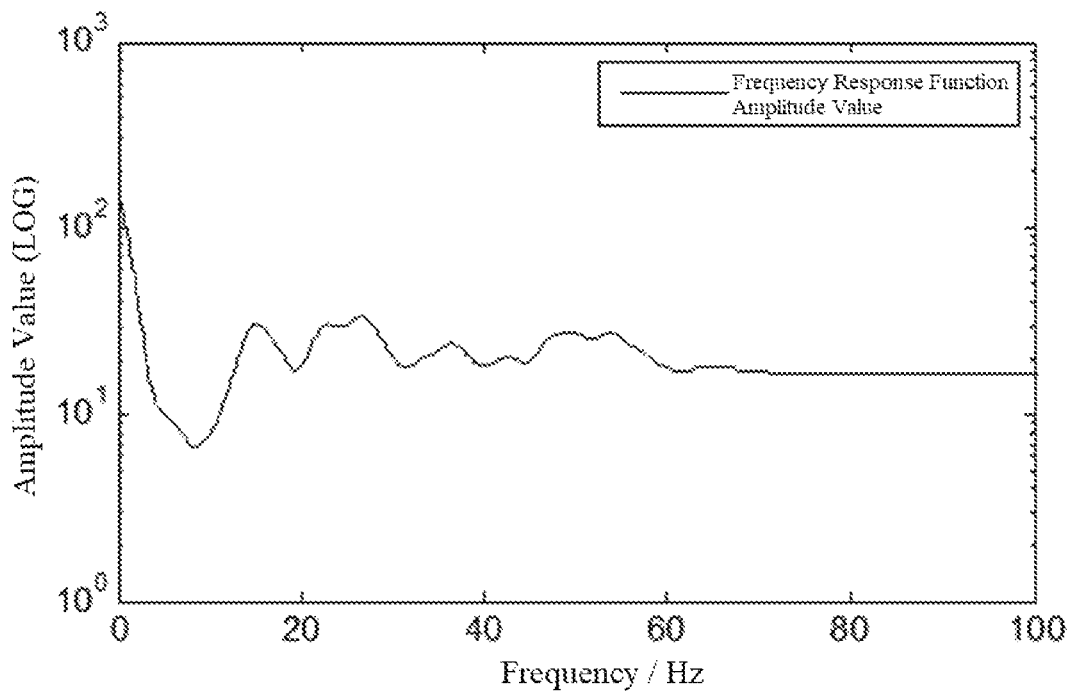
FIG. 12 is a diagram showing the identification effect of the amplitude of the frequency response function of the present invention.
Figure 13:
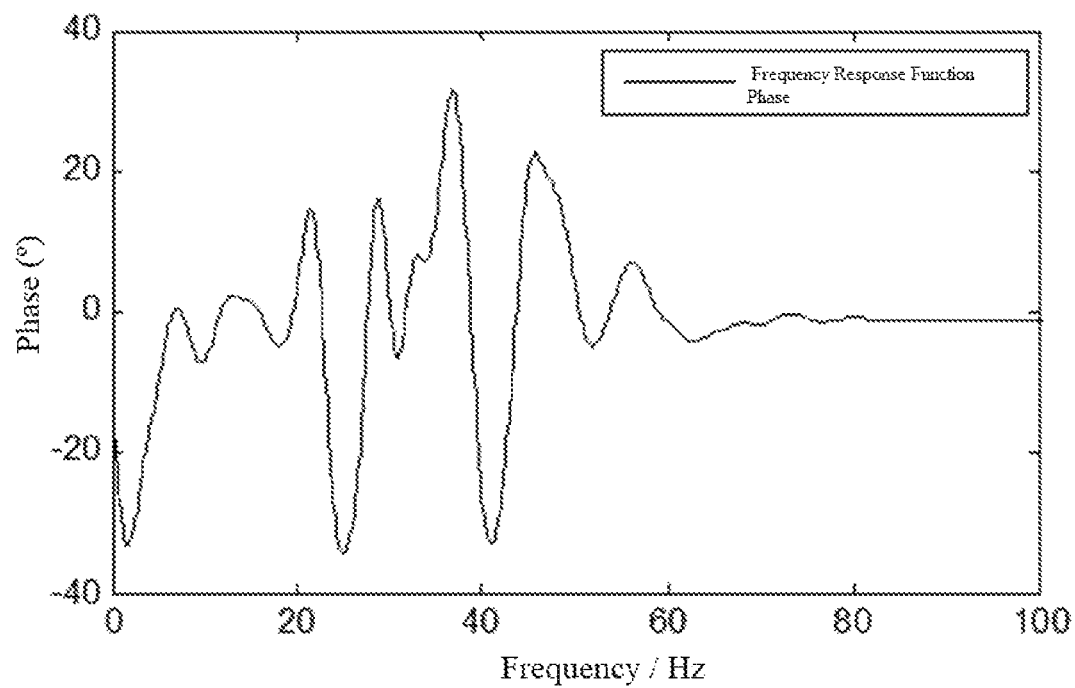
FIG. 13 is a diagram showing the identification effect of the phase of the frequency response function of the present invention.

The frequency response function is identified according to the vertical wheel impact force data obtained from the calibration test and the tire pressure data obtained after the derotation preprocessing. The effects are shown in FIG. 12 and FIG. 13.

Step 5. Formal Test

Figure 14:
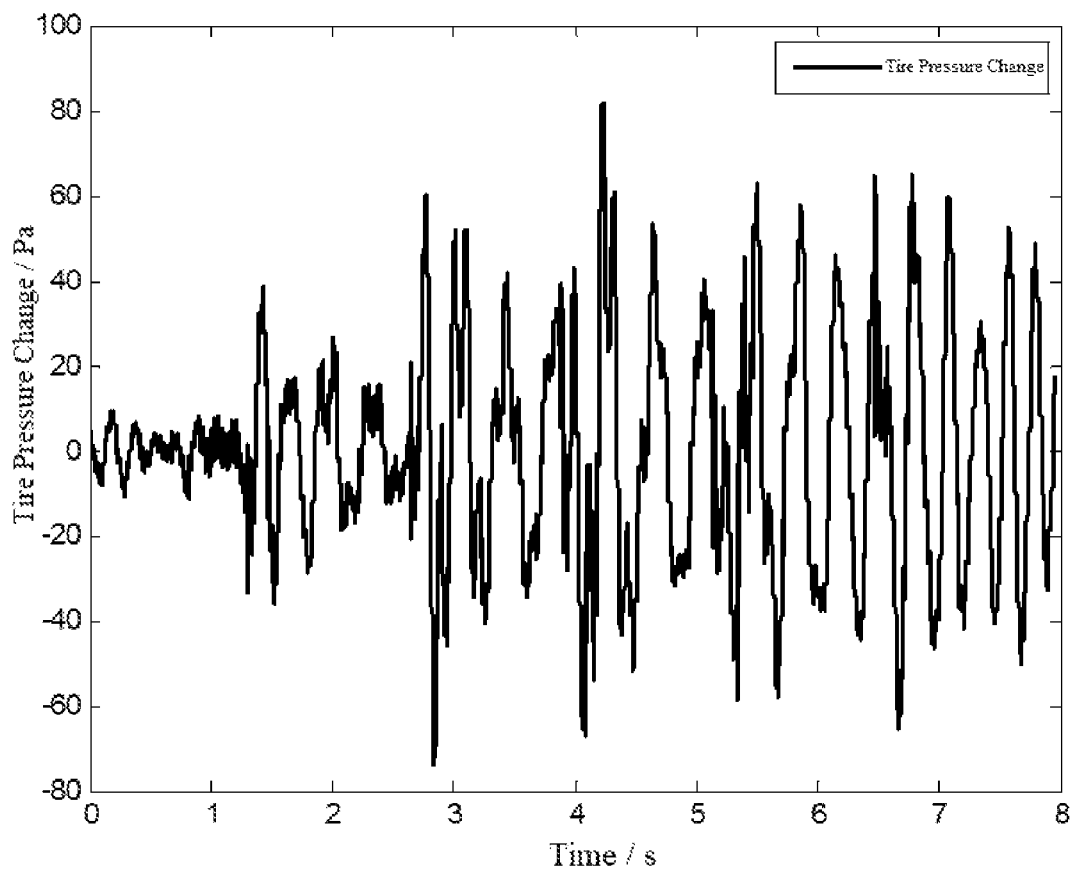
FIG. 14 is a diagram showing the tire pressure measurement value after derotation preprocessing of the present invention.
Figure 15:
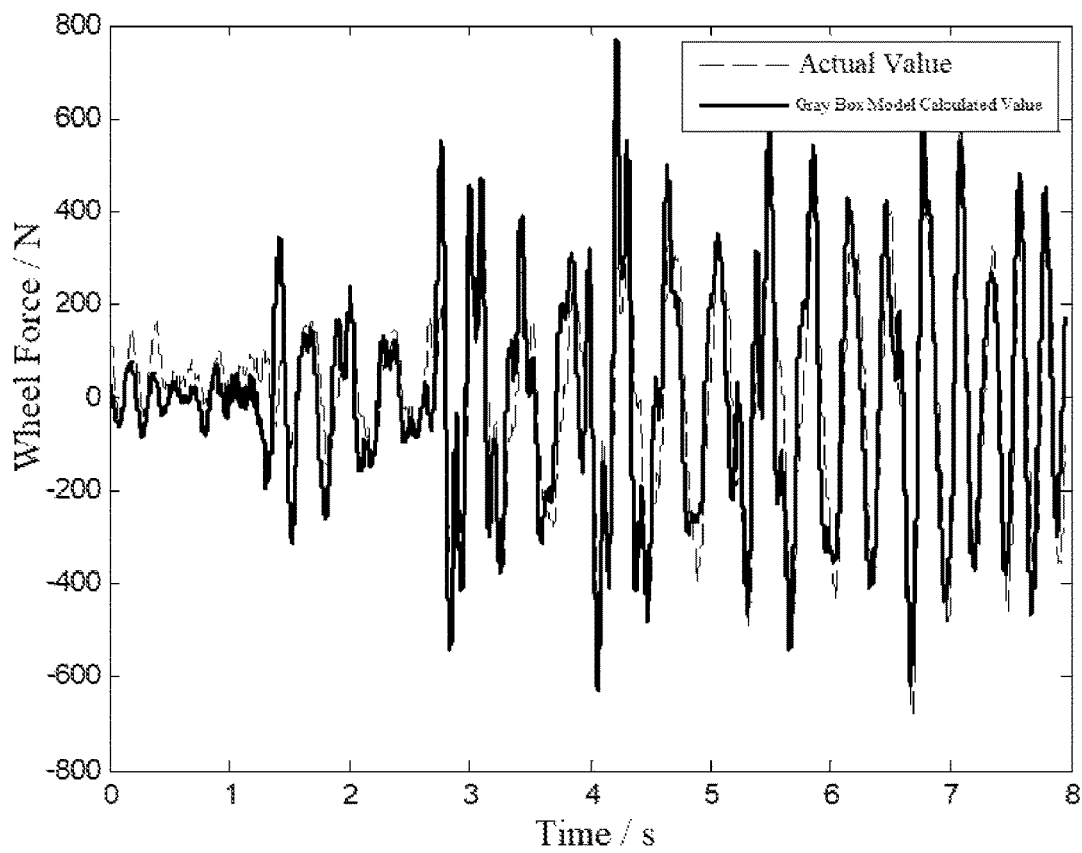
FIG. 15 is a comparison diagram of the value of the vertical wheel impact force calculated by the gray box model and the actual value.
Figure 16:
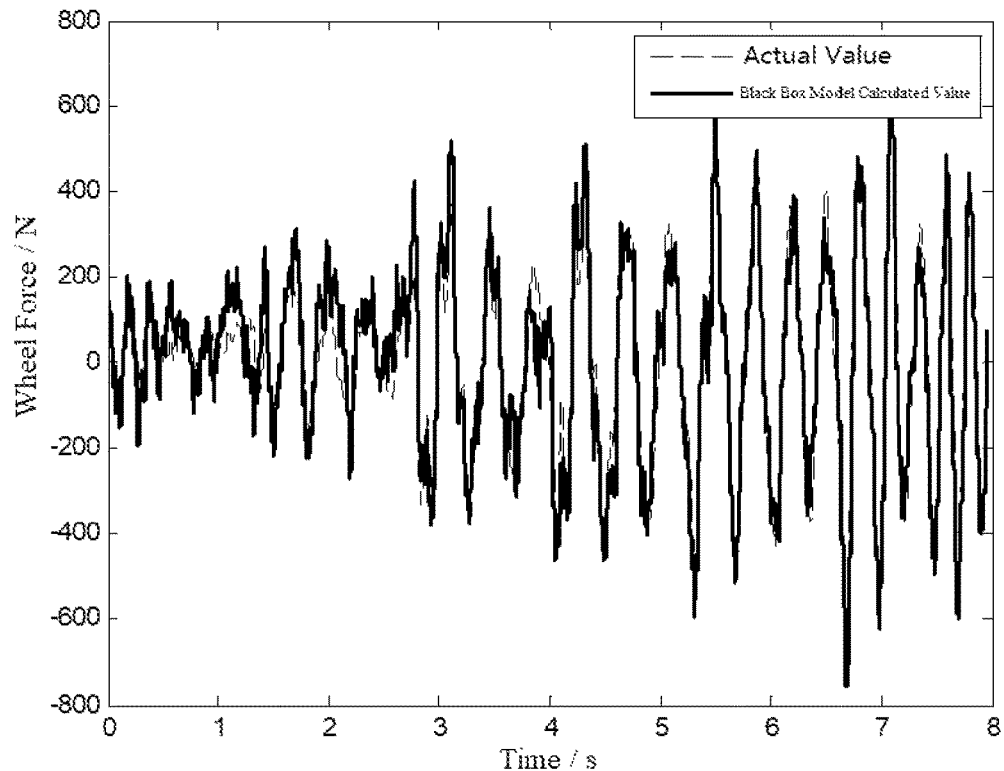
FIG. 16 is a comparison diagram of the value of the vertical wheel impact force calculated by the black box model and the actual value.

After the complete relationship of the tire pressure and the vertical wheel impact force is obtained, the corresponding vertical wheel impact force can be calculated according to the tire pressure data collected in the formal test. The gray box model algorithm can acquire the real-time wheel force data according to the tire pressure data at each moment. The black box model algorithm can acquire the wheel force data in a corresponding period of time according to the tire pressure data in the period of time. The two methods can verify each other so as to improve the reliability of the calculation results. The two results can also be averaged to obtain an optimized ground vertical contact force. In order to illustrate the accuracy of the results, the results calculated by the method of the present invention are compared with the calibrated actual value as shown in FIGS. 14, 15 and 16.

The embodiments of the present invention have been described in detail above with reference to the drawings. However, the present invention is not limited to the described embodiments. Various changes, modifications, substitutions and variations of these embodiments derived by those of ordinary skill in the art without departing from the scope of the principles and technical ideas of the present invention should still be considered as falling within the scope of the present invention.

What is claimed is:

1. A method for measuring vertical wheel impact force in real-time based on tire pressure monitoring, comprising: collecting, by an integrated device, real-time tire pressure data; obtaining a corresponding wheel force by performing a tire pressure derotation preprocessing and a tire pressure-wheel force system identification; and performing a calibration to the corresponding wheel force according to a calibration method, wherein the tire pressure-wheel force system identification comprises a first calculation method of a gray box model and a second calculation method of a black box model;

the first calculation method of the gray box model comprises:

first, describing a relationship between a vertical deformation of a tire and the vertical wheel impact force by a single-degree-of-freedom mass-spring-damper model, wherein, the formula is presented below:

$$c\dot{x} + kx = F_{tire}$$

wherein, c is a vertical damping of the tire, k is a vertical stiffness of the tire, x is the vertical deformation of the tire under a dynamic load, $\dot{x}$ is a first-order differential of time, and $F_{tire}$ is the vertical wheel impact force;

second, establishing a relationship between a tire pressure and the vertical deformation of the tire according to an ideal gas equation, wherein, the formula is presented below:

$$x = \frac{p_0 V_0}{aA(p_0 + \Delta p)}\left(1 - \frac{p_0}{p_0 + \Delta p}\right)$$

$$\dot{x} = -\frac{p_0 \dot{\Delta p} V_0}{aA(p_0 + \Delta p)^2} \times \left(1 - \frac{2p_0}{p_0 + \Delta p}\right)$$

wherein, $p_0$ is an initial tire pressure; $\Delta p$ is a tire pressure change under dynamic load, the derotation preprocessing should be implemented; $\dot{\Delta p}$ is a first-order differential of $\Delta p$ for time; $V_0$ is an initial volume of an inner cavity of the tire under a static load; A is a contact area of the tire under the static load, and an effect of a tire deformation on the contact area is expressed by $$aA\left(1 + \frac{\Delta p}{P_0}\right);$$

accordingly, obtaining a relationship between the tire pressure and the vertical wheel impact force, wherein the formula is presented below:

$$F_{tire} = \frac{cp_0 V_0 (p_0 - \Delta p)}{aA(p_0 + \Delta p)^3} \times \dot{\Delta p} + \frac{kp_0 V_0 \Delta p}{aA(p_0 + \Delta p)^2}$$

lastly, identifying unknown parameters in the formula of the tire pressure-vertical wheel impact force through a Kalman filtering according to accurate tire pressure data and accurate wheel force data obtained from a calibration test;

wherein assuming that parameters to be identified include $$\alpha = \frac{cp_0 V_0}{aA}, \beta = \frac{k}{c},$$

an output is $$y = \frac{\Delta p}{(p_0 + \Delta p)^2},$$

and an input is $u = F_{tire}$, a state variable is expressed as follows:

$$\begin{bmatrix} x_1 \\ x_2 \\ x_3 \end{bmatrix} = \begin{bmatrix} y \\ \alpha \\ \beta \end{bmatrix}$$

a state equation is expressed as follows:

$$\begin{bmatrix} \dot{x}_1 \\ \dot{x}_2 \\ \dot{x}_3 \end{bmatrix} = \begin{bmatrix} \dot{y} \\ 0 \\ 0 \end{bmatrix} = \begin{bmatrix} \frac{u}{x_2} - x_1 x_3 \\ 0 \\ 0 \end{bmatrix}$$

and an observation equation is expressed as follows:

$$y = [1, 0, 0] \begin{bmatrix} x_1 \\ x_2 \\ x_3 \end{bmatrix};$$

the second calculation method of the black box model comprises:

assuming that the tire pressure change and the vertical wheel impact force satisfy a linear convolution relationship, then in a frequency domain, obtaining the following formula:

$$F_{tire}(w) = \Delta p(w) H(w)$$

wherein, H(w) is a frequency response function; $F_{tire}(w)$ and $\Delta p(w)$ are Fourier transforms of time-history data of $F_{tire}(t)$ and $\Delta p(t)$ respectively;

identifying the frequency response function according to the accurate tire pressure data and the accurate wheel force data obtained from the calibration test;

wherein, both the gray box model and the black box model are functions of the tire pressure and the corresponding wheel force, and the gray box model and the black box model are configured to correct each other.

2. The method for measuring vertical wheel impact force in real-time based on tire pressure monitoring of claim 1, wherein the tire pressure derotation preprocessing eliminates periodic interferences caused by an uneven air pressure distribution during a rotation of the tire by a method of filtering, so that the real-time tire pressure data after preprocessing directly reflects effects of the vertical wheel impact force.

3. The method for measuring vertical wheel impact force in real-time based on tire pressure monitoring of claim 1, wherein in the tire pressure-wheel force system identification, a relation model of the tire pressure and the vertical wheel impact force is established according to tire vibration characteristics, and specific parameters of the relation model are identified according to the accurate tire pressure data and the accurate wheel force data obtained from the calibration test, so that the corresponding wheel force is calculated in a subsequent formal test with merely the tire pressure known.

4. The method for measuring vertical wheel impact force in real-time based on tire pressure monitoring of claim 1, wherein the integrated device comprises a tire pressure sensing system, a central signal control system, and a data analysis system;

wherein, the tire pressure sensing system collects air pressure change data in the inner cavity of the tire through a tire pressure sensor, and exchanges instructions and data with the central signal control system through a local signal controller in a wired or wireless control manner;

wherein, the central signal control system transmits collected data to the data analysis system, and the data analysis system uses an embedded real-time vertical wheel impact force calculation program to automatically analyze the collected data and output a visual evaluation result of the wheel force.

5. The method for measuring vertical wheel impact force in real-time based on tire pressure monitoring of claim 1, wherein the calibration method uses a set of test device and a third calculation method to obtain the accurate wheel force data, and calibrate the integrated device.

6. The method for measuring vertical wheel impact force in real-time based on tire pressure monitoring of claim 5, wherein the calibration method uses the test device for the calibration, and the test device integrates a data collection, a signal transmission, and a result analysis as a whole;

wherein, the test device for calibration mainly comprises: a set of approach bridge tracks, a main bridge track, a track acceleration sensing system, a track bearing force sensing system, a central signal control system, and a data analysis system;

wherein, when the tire rolls on the main bridge track, the wheel force is obtained from collected track vibration information, the tire enters the main bridge track from the approach bridge tracks, and the main bridge track only contacts with a ground through bearings;

wherein, firstly the track acceleration sensing system collects a vertical acceleration of the tracks and exchanges first instructions and first data with the central signal control system in a wired or wireless manner;

wherein, secondly the track bearing force sensing system collects a bearing force of the tracks and exchanges second instructions and second data with the central signal control system in the wired or wireless manner;

wherein, thirdly in addition to exchange data and instructions with the the track acceleration sensing system and the track bearing force sensing system, the central signal control system also provides third data to the data analysis system; and the data analysis system uses an embedded algorithm program to analyze the third data and output a visual evaluation result of a calibrated wheel force.

7. The method for measuring vertical wheel impact force in real-time based on tire pressure monitoring of claim 6, wherein a calculation method for a force calibration of the force comprises when the tire rolls on the main bridge track, the wheel force and a structural response of the track satisfy the following formula:

$$F_{tire}+G_{tire}=\Sigma F_{bearing}+\Sigma ma$$

wherein $F_{tire}$ is the vertical wheel impact force; $G_{tire}$ is the static load of the tire; $\Sigma F_{bearing}$ is a resultant force of the bearings after removing a weight of the main bridge track, namely, merely subjected to effects of the tire; $\Sigma ma$ is a resultant inertia force of various units of the main bridge track.

8. The method for measuring vertical wheel impact force in real-time based on tire pressure monitoring of claim 1, further comprising the following steps:

installing and debugging the integrated device;

obtaining the accurate tire pressure data and wheel force data through a calibration test;

performing the tire pressure derotation preprocessing;

obtaining the relationship between the tire pressure and the wheel force by the system identification of the grey box model or the black box model;

obtaining the real-time tire pressure data from the integrated device for tire pressure-wheel force measurement in a formal test;

performing the tire pressure derotation preprocessing; and calculating the wheel force according to the relationship between the tire pressure and the wheel force.

\* \* \* \* \*